United States Patent [19]
Kohn

[11] Patent Number: 5,798,160
[45] Date of Patent: Aug. 25, 1998

[54] FOAM-PLASTIC CORE FOR STRUCTURAL LAMINATE

[75] Inventor: Henri-Armand Kohn, Croton-on-Hudson, N.Y.

[73] Assignee: Baltek Corporation, Northvale, N.J.

[21] Appl. No.: 653,911

[22] Filed: May 28, 1996

Related U.S. Application Data

[63] Continuation-in-part of Ser. No. 214,430, Mar. 18, 1995.
[51] Int. Cl.$^6$ .................................. B32B 3/26; B32B 3/10
[52] U.S. Cl. .......................... 428/56; 428/55; 428/310.5; 428/317.1; 156/78
[58] Field of Search .......................... 428/54, 55, 56, 428/71, 317.3, 317.1, 310.5; 156/250, 264, 78

[56] References Cited

U.S. PATENT DOCUMENTS 4,536,427 8/1985 Kohn .................................. 428/44
5,462,623 10/1995 Day .................................. 156/250

*Primary Examiner*—Alexander Thomas
*Attorney, Agent, or Firm*—Michael Ebert

[57] ABSTRACT

A foam-plastic core for a structural laminate produced by converting standard, rectangular slabs of closed-cell, rigid foam plastic stock in which the density of each slab varies from the inner to the outer regions thereof into relatively thin panels useable as the core of a structural laminate in which the core is sandwiched between facing sheets. To produce these cores, several standard slabs are stacked and bonded together by parallel lines of adhesive compatible with the foam plastic material to create a large multi-slab block. The block is then sliced transversely in parallel planes normal to the lines of adhesive to yield a plurality of panels. Each panel is composed of a series of interconnected foam-plastic sections derived from respective slabs of the block whereby the density of the sections is evenly distributed throughout the panel and the mechanical properites of the panel are therefore predictable and satisfy structural laminate criteria.

3 Claims, 2 Drawing Sheets

FOAM-PLASTIC CORE FOR STRUCTURAL LAMINATE

RELATED APPLICATION

This application is a continuation-in-part of my copending application of the same title Ser. No. 08/214,430 filed Mar. 18, 1995 pending.

BACKGROUND OF INVENTION

1. Field of Invention

This invention relates generally to panels of closed-cell rigid foam-plastic material useable as the core of a structural laminate in which the core is sandwiched between outer facing skins, and more particularly to a panel of this type composed of a series of interconnected sections all having substantially the same density.

2. Status of Prior Art

My prior U.S. Pat. No. 4,343,846 (Kohn) discloses a structural laminate formed of an end-grain balsa wood core laminated to thin facing skins formed of reinforced fiberglass or other suitable material. The advantage of using end-grain balsa as the core panel is that it is capable of supporting far greater loads than flat-grain balsa of the same density.

End-grain balsa core sandwich laminates are widely used in transportation and handling equipment, such as for railroad car floors, shipping containers, cargo pallets, bulkheads and reefer bodies, as well as in aircraft and boating applications. A structural laminate of the end-grain balsa core type has an exceptionally high strength-to-weight ratio and excellent thermal insulation properties.

In some applications where it is necessary that the core of the laminate be conformed to a curved surface, such as a boat hull or a cylindrical storage tank, use is made for this purpose of a contourable balsa wood blanket, such as the blanket disclosed in the Shook U.S. Pat. No. 3,540,967 in which a panel of balsa wood is divided into an array of small balsa wood blocks or tiles which are adhered to a fabric scrim or common carrier whereby the blanket can be conformed to a contoured surface.

Such blankets, known commercially under the trademark CONTOURKORE, are useful in the construction of reinforced plastic boats and larger vessels, for they lend themselves to lamination between layers of reinforced fiberglass and other plastic skins, thereby bringing about a distribution of weight favorable to high stability and buoyancy, as well as imparting stiffness to the structure.

As pointed out in my prior U.S. Pat. No. 4,343,846, in certain applications the weight of existing types of laminates having a balsa wood core still exceeds optimal requirements, despite the inherent light weight of balsa. In order therefore to reduce the weight of the balsa core, holes are punched therein to produce an exceptionally light weight reticuled core. The same patent also mentions the use of rigid foam plastic in lieu of balsa wood.

In the present invention, in order to provide a core panel for a structural laminate that is even lighter in weight than low density balsa wood, use is made of closed-cell, rigid foam-plastic material such as polyvinyl chloride or polyurethane foam. This foam-plastic core material has mechanical properties which are acceptable in many practical applications, even though foam plastic lacks the structural strength of balsa.

The density of a material, whether of balsa wood or foam-plastic, is expressed in pounds per cubic foot. Foam plastic materials are available in densities significantly lower than those of balsa wood which on the average has a density of about 9 pound per cubic foot, this being far less than the lightest North American wood species.

The use of closed-cell foam-plastic material as the core for a structural laminate is well-known. Thus the Johannsen U.S. Pat. No. 3,867,238 discloses a laminate for a boat hull having a closed-cell PVC core sandwiched between outer skins. In order for this core to conform to the curvature of the hull, the rigid core slab which has some degree of elasticity, is slotted at one side to create an array of block-like elements which are interhinged by the unslotted portions of the foam-plastic on the other side of the slab. These articulated elements can, therefore, be conformed to a contoured hull surface.

The problem to which the present invention is addressed is the unpredictable density of existing foam-plastic core panels for structural laminates and the resultant uncertain load-bearing characteristics of these laminates. This problem arises from the existing method by which these panels are produced.

Conventional foam-plastic panels are derived from commercially-available standard slabs of rigid foam-plastic stock whose typical dimensions are 96 inches in length, 48 inches in width and 4 inches in height. To produce core panels, each slab is longitudinally sliced in planes parallel to the flat faces of the slab in the appropriate thickness, say one or two inches, depending on the specifications of the structural laminate for which the panel is intended. If, therefore, the thickness of the core panels to be sliced from a slab of given thickness is such that the slab cannot be evenly divided, this leaves over waste slab material. For example, if the slab to be sliced is four inches thick and the core panels are to be 1.5 inches thick, this leaves over a waste panel having a one inch thickness.

The density of the foam-plastic material in each such core panel is not evenly distributed, for the panel is a longitudinal slice taken from a standard slab whose density varies from the inner to the outer regions thereof. Thus while the core panels so produced all have the same dimensions, they vary in density and therefore lack predictable mechanical properties.

The reason this problem arises is that in producing a closed-cell foam-plastic slab, a foam-reaction mixture is poured into a mold, and as gas is generated to foam the plastic material, the material is caused to expand. Because this expansion takes place within the confines of the mold and is limited thereby, the density of the slab so produced is lowest in the inner region of the body and is greatest in the outer region thereof.

As a consequence, core panels produced by the conventional technique in which the panels are sliced from slabs of foam-plastic stock, each have a density which varies throughout the body of the panel, and these variations in density result in uncertain mechanical properties. The mechanical properties of structural laminates having a foam-plastic core panel are critical to design criteria. But with the conventional technique for producing these core panels, the mechanical properties of the panels are not consistent, nor are they predictable.

SUMMARY OF INVENTION

In view of the foregoing, the main object of this invention is to provide rigid foam-plastic panels having consistent mechanical properties which render the panels useable as cores for structural laminate having good load-bearing characteristics.

3

More particularly, an object of this invention is to provide panels of the above type which are derived from a large multi-slab block formed by a stack of standard closed-cell foam-plastic slabs bonded together by lines of adhesive which are compatible with the foam-plastic material, the panels being sliced from the block in planes normal to the lines of adhesive.

A significant advantage of the invention is that the slabs from which the core panels are derived are fully utilized and there is no waste.

Briefly stated, these objects are accomplished in a foam-plastic core for a structural laminate produced by converting standard rectangular slabs of closed-cell, rigid foam-plastic stock in which the density of each slab varies from the inner to the outer region thereof, into relatively thin panels useable as the core of a structural laminate in which the core is sandwiched between facing sheets.

To produce these cores, several standard slabs are stacked and bonded together by parallel lines of adhesive compatible with the foam plastic material to create a large multi-slab block. The block is then sliced transversely in parallel planes normal to the lines of adhesive to yield a plurality of panels. Each panel is composed of a series of interconnected foam-plastic sections derived in a common plane from respective slabs of the block whereby the density of the sections is evenly distributed throughout the panel and the mechanical properties of the slab are therefore predictable and satisfy structural laminate design criteria.

BRIEF DESCRIPTION OF DRAWINGS

For a better understanding of the invention, as well as other objects and features thereof, reference is made to the detailed description to follow to be read in conjunction with the accompanying drawing wherein.

DESCRIPTION OF INVENTION

The Core Panel

Figure 1:
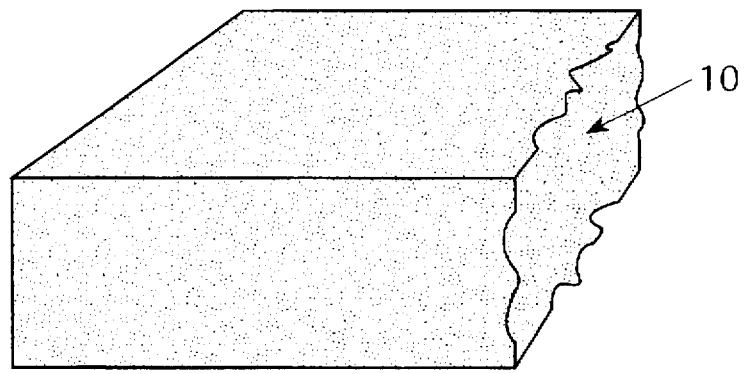
FIG. 1 shows, in perspective, a standard slab of closed-cell foam-plastic material.

Referring now to FIG. 1, there is shown a standard rectangular slab 10 of rigid, closed-cell foam-plastic stock formed of polyvinyl chloride, polyurethane or other light weight, closed-cell foam plastic material. As pointed out previously, the density of a standard slab, in pounds per cubic foot, is not uniform throughout the body of the slab, for in the molding process, as the foam expands within the confines of the mold, it develops regions of different density which vary from the inner region to the outer region of the body.

If, therefore, standard slabs are glued together by parallel lines of adhesive to form a large block which is then sliced longitudinally in planes parallel to these lines into a plurality of core panels of a thickness suitable for laminates, no such panel will have a substantially uniform foam density throughout its body, and the load-bearing characteristics of the laminates would not be predictable.

Figure 2:
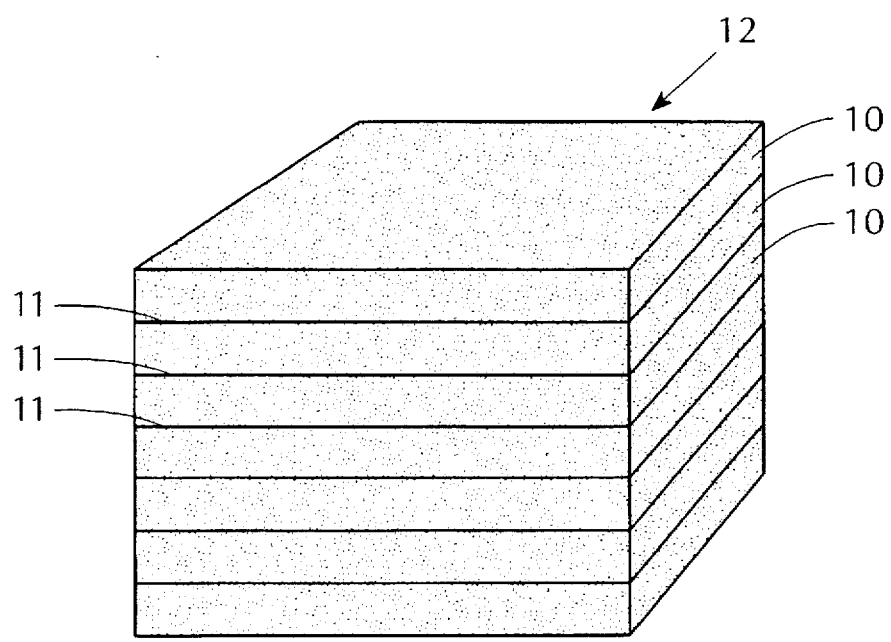
FIG. 2 shows a large multi-slab block formed by a stack of interlaminated slabs.

In a technique in accordance with the invention for producing core panels for structural laminates having acceptable load-bearing characteristics, the first step is to provide a stack of rigid foam-plastic slabs 10 and bond them together, as shown in FIG. 2, by parallel lines of adhesive 11. This creates an integrated large multi-slab block 11 in which the lines of adhesive are parallel to the planar upper and lower ends of the block. While FIG. 2 shows a block formed by a stack of seven slabs, in practice the block may be formed by a different number, such as eight or nine slabs, depending on the desired number of the core panels to be drived from the block.

Where the slabs to be laminated together by adhesive are not perfectly flat, their faces may be sanded to render them flat. But this is not necessary when the adhesive used to join the slabs together accommodates itself to the uneven faces of the slabs.

The adhesive used to bond slabs 10 together must not be chemically reactive with the foam plastic material and must also be compatible with the resins or adhesives used to bond the panels derived from the block to facing skins to create structural laminates.

Another factor that must be taken into account is the ability of the adhesive to bond the foam-plastic slabs together, for the adhesive is applied to closed-cells impermeable to liquid. Hence should the adhesive be of the type having a volatile solvent, the solvent would then not be permitted by the closed-cell foam material to evaporate and allow the adhesive to harden and cure.

An adhesive we have found suitable for this purpose is a water-borne, rubber-based contact formulation with a zinc complex antioxidant/accelerator system, the complex being zinc di-n-butyl dithiocarbonate. The dispersion of the adhesive system in water rather than other volatile solvents does not degrade the foam. Another suitable adhesive is a water-based polyacrylic polymer.

Figure 3:
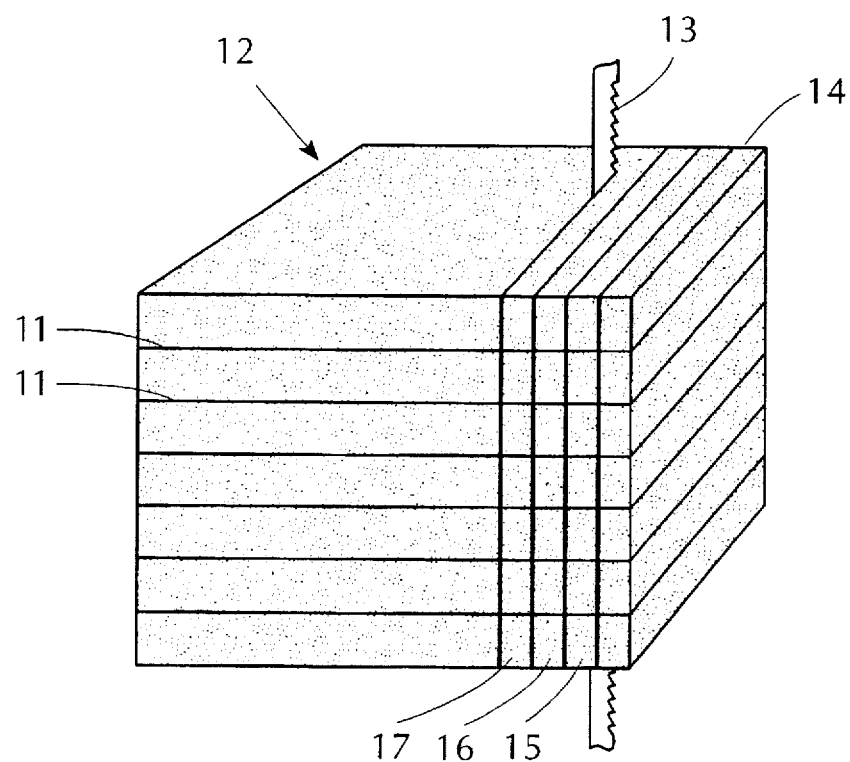
FIG. 3 illustrates the manner in which the multi-slab block is sliced into core panels.

In the final step in the technique, as shown in FIG. 3, the block 12 is sliced transversely by a cutting blade 13 into core panels 14, 15, 16, 17, etc., of the desired thickness. These slices are in planes normal to the parallel lines of adhesive 11.

Figure 4:
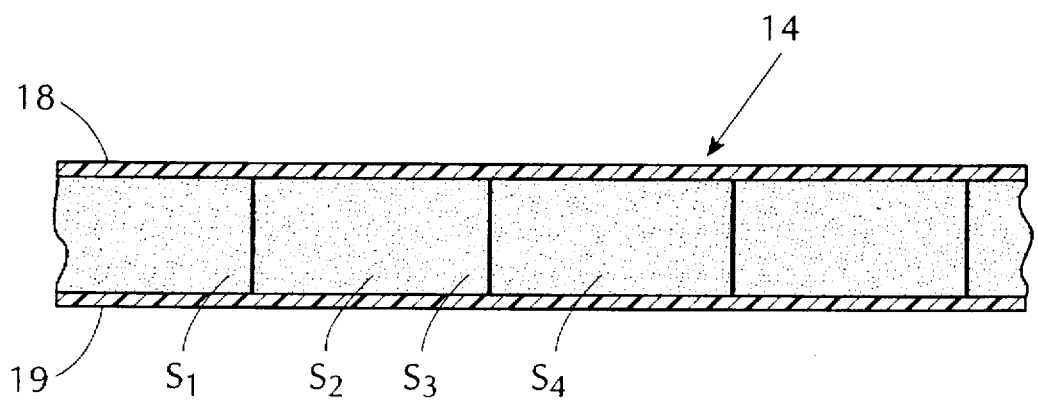
FIG. 4 is a section taken through a structural laminate that includes a core panel in accordance with the invention.

Hence each panel is composed of a series of interconnected sections derived from the respective slabs of block 12. Thus slab panel 14, as shown in FIG. 4, is composed of foam-plastic sections $S_1$, $S_2$, $S_3$, $S_4$, etc., each having a density that depends on the density of the respective slab in block 12 from which it was sliced. Since all of the sections which make up a particular panel are derived in a common plane from respective slabs of the block, the density of the sections is evenly distributed throughout the panel.

In contradistinction, a longitudinal slice taken through the multi-slab block, as was the prior practice, would cut through a single slab or a laminate of adjoining slabs, and the density of the resultant panel would not be evenly distributed throughout the body of the panel, for in that case, the density of the panel will be relatively low in the inner region of the panel and significantly higher in the outer region.

Core panel 14 is laminated by a suitable adhesive to outer facing skins 18 and 19 to form a structural laminate having good load-bearing characteristics. As pointed out previously, the adhesive used to bond the slabs together must be compatible with the adhesive used to laminate the panel to the facing skins.

Properties of Core Panel

The mechanical properties of a rigid foam plastic core panel for a structural laminate which determine its suitability for aircraft, boating and other applications are the following:

(a) Density (lb/cu.ft.)
(b) Tensile Strength (PSI)
(c) Compression Strength (PSI)
(d) Compression Modulus (e) Shear Strength (PSI)
(f) Shear Modulus (PSI)
(g) Shear Elongation (%)

These properties are interrelated. Thus a low density foam will possess a lower tensile strength than a high density foam. The mechanical properties of a structural laminate whose core is a rigid foam plastic panel are critical to design criteria; and these properties must be consistent and therefore predictable. But if the core panel is a planar slice taken from a standard slab of rigid foam plastic stock whose density varies throughout the body of the slab, the core panel will then have uncertain mechanical properties.

A core panel in accordance with the invention is derived from a right angle slice taken through a block formed by a stack of interbonded standard rigid foam plastic slabs, each have a varying density that is lowest in the inner region of the slab and greatest in the outer region thereof. The resultant core panel is composed of interbonded sections having like densities, for the sections are derived from corresponding regions in the stack of slabs. The panels therefore have consistent and predictable mechanical properties.

A core panel in accordance with the invention is now commercially available under the trademark AIRLITE. Also commercially available is a conventional core panel derived from a slab of standard rigid foam plastic stock, the panel being a longitudinal slice taken through the slab. This conventional panel is sold under the trademark DIVINY-CELL.

In order to compare the mechanical properties of a multisection AIRLITE panel with a conventional DIVINY-CELL panel, extensive laboratory tests were conducted on different densities of each of these products.

Then the CoV (Coefficient of Variation) for each product was determined and compared. These tests indicate that in all instances, the mechanical properties of AIRLITE lie within significantly tighter ranges than DIVINYCELL and are therefore more predictable. Hence a multi-section core panel in accordance with the invention possesses marked advantages over a conventional core panel which is a planar slice taken from a standard foam plastic slab.

While there has been shown a technique for producing a multi-section core panel for a structural laminate and a technique for producing this panel, it is to be understood that many changes may be made therein without departing from the spirit of the invention.

What I claim:

1. A core panel for forming a structural laminate in which the panel is sandwiched between facing skins, said panel comprising a series of interbonded sections of rigid, closed-cell, foam-plastic material, said sections having substantially the same density whereby the density of the sections is evenly distributed throughout the core panel to provide a panel having predictable mechanical properties to satisfy structural laminate criteria, the sections being interbonded by an adhesive compatible with the foam-plastic material, said panel being derived from a stack of closed-cell, foam-plastic standard slabs, each having a density which varies from an inner region to an outer region thereof, the slabs in the stack being interbonded by lines of adhesive, the panel being a slice taken from the block in a plane normal to the lines of adhesive whereby each interbonded section in the series is taken from a corresponding slab in the block and has substantially the same density, and facing skins laminated to opposing upper and lower surfaces of the panel to form said structural laminate.

2. A core panel as set forth in claim 1, in which the foam plastic material is polyurethane.

3. A core panel as set forth in claim 1, in which the adhesive is a water-borne rubber-based contact adhesive.

* * * * *